United States Patent [19]
Doucette et al.

[11] Patent Number: 4,871,079
[45] Date of Patent: Oct. 3, 1989

[54] FLOATABLE COOLER CHEST

[76] Inventors: Kenneth E. Doucette, 5435 Barber Loop; Chris W. Jennings, 810 Bayview Dr., both of Baytown, Tex. 77520

[21] Appl. No.: 189,215

[22] Filed: May 2, 1988

Related U.S. Application Data

[63] Continuation-in-part of Ser. No. 162,157, Feb. 29, 1988, abandoned, Continuation of Ser. No. 897,328, Aug. 18, 1986, abandoned.

[51] Int. Cl.⁴ .............................................. B65D 1/24
[52] U.S. Cl. .................................. 220/1 R; 220/20; 220/902
[58] Field of Search ...................... 220/1 R, 20, 902

[56] References Cited

U.S. PATENT DOCUMENTS

| | | | |
|---|---|---|---|
| 2,737,750 | 3/1956 | Sprague | 220/902 |
| 3,013,922 | 12/1961 | Fisher | 220/902 |
| 3,027,040 | 3/1962 | Jodell | 220/902 |
| 3,367,525 | 2/1968 | Elder | 220/1 R |
| 3,429,474 | 2/1969 | Cann | 220/20 |
| 3,533,529 | 10/1970 | Helbig | 220/1 R |
| 3,831,209 | 8/1974 | Clingman | 220/1 R |
| 4,195,757 | 4/1980 | Jefferson | 220/20 |
| 4,238,934 | 12/1980 | Hotta | 62/372 |

Primary Examiner—George E. Lowrance
Attorney, Agent, or Firm—Guy E. Matthews

[57] ABSTRACT

An integral floating cooler structure including a barge member having a barge bottom and barge sides with a storage chest having a chest bottom formed in common with the barge bottom, and chest sides of less thickness that the barge sides and having lower portions formed in common with the barge sides. The chest bottom and said chest sides are of thickness sufficient to provide thermal insulation. The barge bottom and the barge sides are displacement volume sufficient to provide buoyancy for the cooler structure. The exterior surfaces of the chest sides; the barge sides and the barge bottom forms a common exterior surface for the cooler structure. The interior surface of the chest bottom and the chest sides forms a common interior surface for the cooler structure.

7 Claims, 4 Drawing Sheets

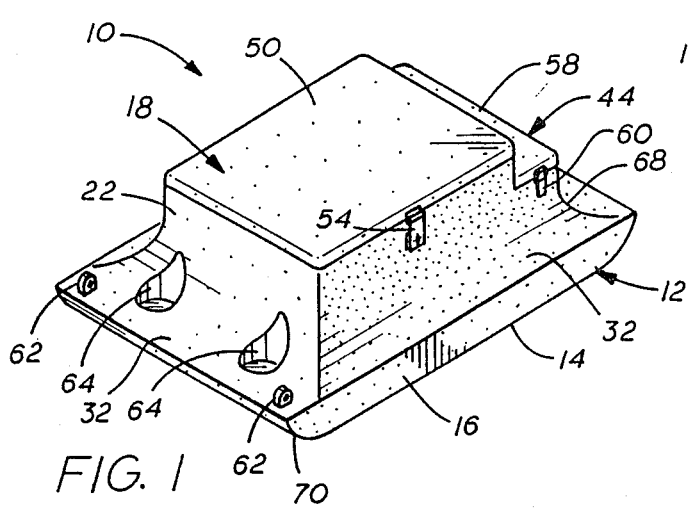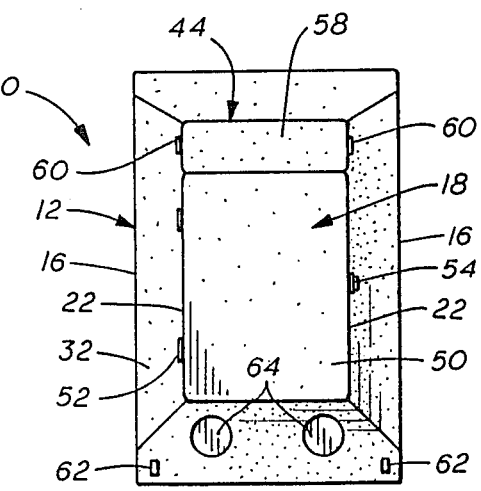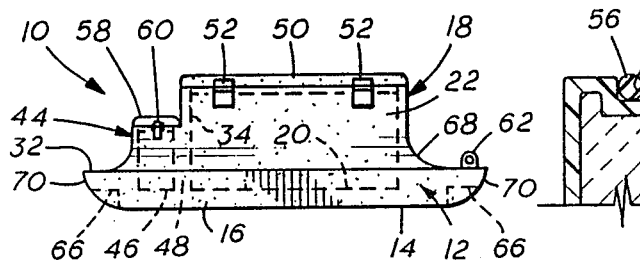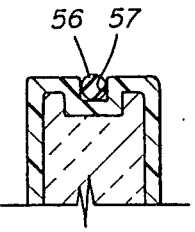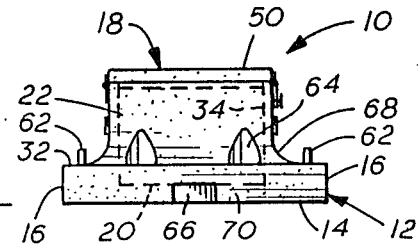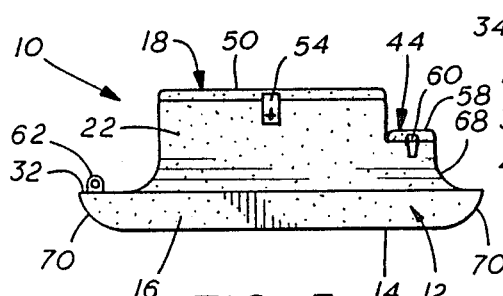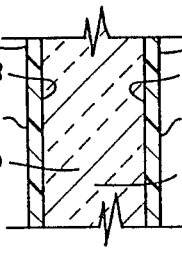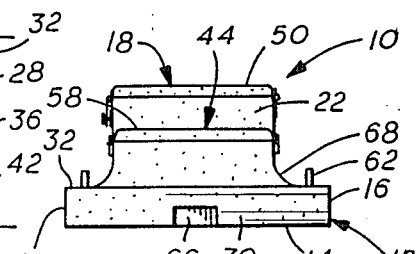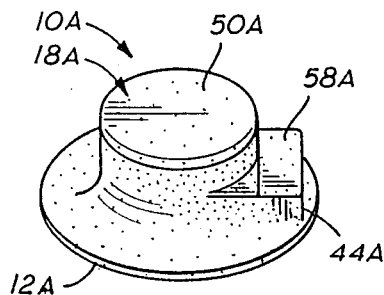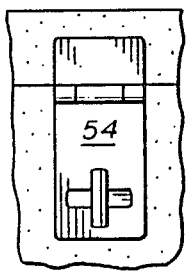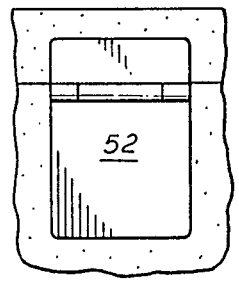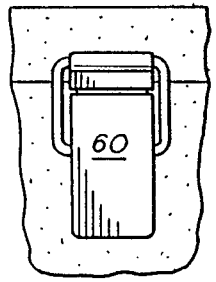

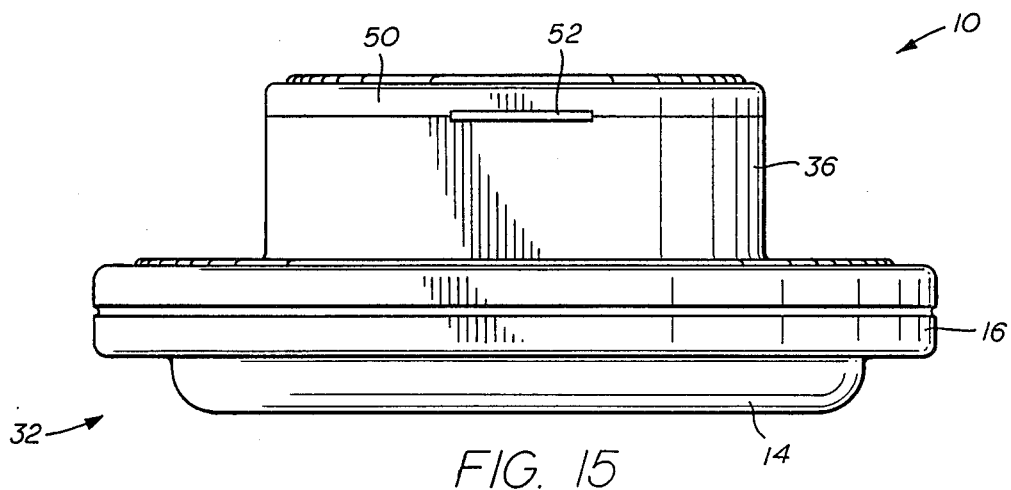
FIG. 15
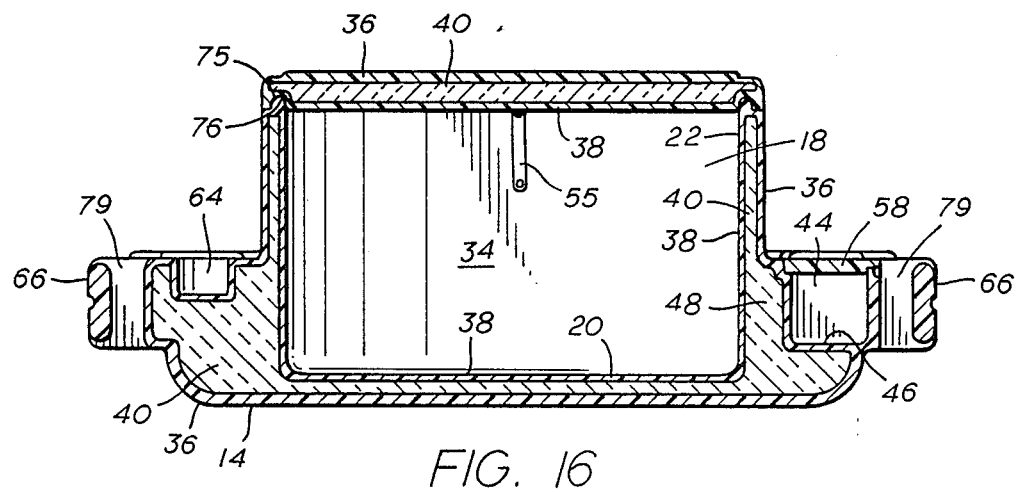
FIG. 16
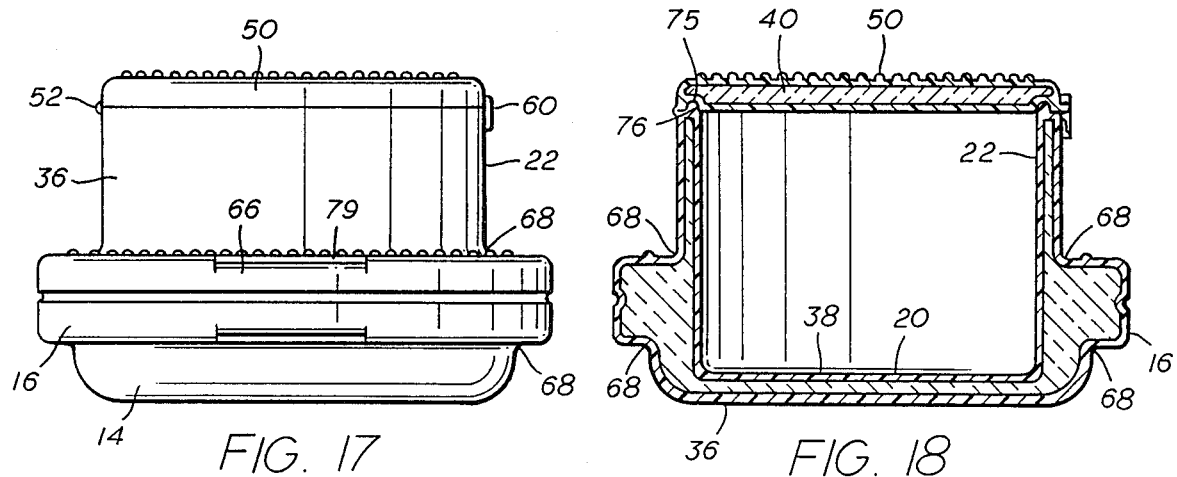
FIG. 17
FIG. 18

FLOATABLE COOLER CHEST

This is a continuation-in-part of copending application Ser. No. 162,147, filed Feb. 29, 1988, now abandoned, which itself is a continuation of a prior copending application Ser. No. 897,328, filed Aug. 18, 1986, now abandoned.

FIELD OF THE INVENTION

This invention generally relates to portable coolers and more particularly pertains to an integral floating cooler useful for the needs of persons engaged in water activities.

BACKGROUND OF THE INVENTION

Fishermen, bird hunters, skin divers, scuba divers, canoeists and the like sometimes spend several hours in or near the water with little or no access to food or beverage. The fishermen and hunters sometimes have need to store their catch in a cool place. Fishermen sometimes need a place to store bait. All these persons need a place to cache their personal effects secure from pilferage and water damage yet near enough for immediate use, such as hunting or fishing licenses, cigarettes, money, time pieces and the like. The present invention provides a floatable structure which may be taken along into the water with each person, even under rough water conditions such as surf or river rapids, which will fulfill all these needs as appropriate.

The presently known prior art relating to this invention are U.S. Pat. No. 411,201, U.S. Pat. No. Des. 273,074, and and U.S. Pat. No. 4,146,279.

OBJECTS OF THE INVENTION

A principle object of the present invention is to provide an integral floating cooler structure which is all of: strong, light weight, buoyant, well insulated, virtually unsinkable, even in surf or river rapids, inexpensive, and attractive.

Another object of the present invention is to provide an integral floating cooler which forms a cooler chest of internal size as large as needed and which also forms a personal effects safe or cache which may remain water tight.

Another object of the present invention is to provide a floating, watertight, insulated, supply chest which can be towed behind waders or boats.

Another object of the present invention is to provide an integral floating cooler which may be easily and simply mass produced with commercially available materials and equipment.

Yet another object of the invention is to produce a floating cooler with colors which are built into the outer surface of the cooler such as white, traffic orange, yellow, blue, and the like.

Yet another object of the present invention is to provide a floating cooler having receptacles in which to place opened beverages during the time that the cooler is in use.

SUMMARY OF THE INVENTION

The foregoing and other objects of the invention are attained in an integral floating cooler structure shaped to provide both buoyancy and stability, and insulated to provide a protective thermal barrier for supplies. The structure includes (a) a barge member having a barge bottom and barge sides; (b) a storage chest having a chest bottom formed in common with the barge bottom, and chest sides of less thickness than the barge sides and having lower portions formed in common with the barge sides. The chest bottom and the chest sides are of thickness sufficient to provide thermal insulation. The barge bottom and the barge sides are of displacement volume sufficient to provide buoyancy for the cooler structure. The exterior surfaces of the chest sides, the barge sides, and the barge bottom form a common exterior surface for the cooler structure. The interior surface of the chest bottom and the chest sides form a common interior surface for the cooler structure. The exterior surface and the common interior surface are formed in a mold as skins which enclose a cavity with the cavity being filled with a hardened buoyant foam material. The cooler structure may include a personal effects safe having a safe bottom formed in common with the barge bottom and safe sides formed partially in common with the chest sides and formed partially as a common partition between the safe and the chest, wherein the surfaces of the partition and the interior surfaces of the safe comprise a portion of the common interior surface. The skin may be formed of plastic material such as polyethylene, polypropylene, polyvynalchloride (PVC), polymethalpentane, styrene, and cellulose. The hardened foam material maybe formed of the group of plastics including polyethylene, polypropylene, polyurethane, polyvynalchloride (PVC), polymethalpentane, styrene, and cellulose. A closure lid is included in hinged connection with the top of the storage chest with releasing latching means for latching the closure lid in closed position, and a sealing element for sealing the juncture of the closure lid with the top of the storage chest. A closure cover is included in removably latched and sealed relation with the top of the personal effects safe. The cooler structure may be of rounded shape when seen in a plan view.

BRIEF DESCRIPTION OF THE DRAWING

FIG. 1 is a perspective view showing a preferred embodiment of the integral cooler structure of the present invention;

FIG. 2 is a plan view of the cooler structure of FIG. 1;

FIG. 3 is a right side elevation of the cooler structure of FIG. 1;

FIG. 4 is a front elevation of the cooler structure of FIG. 1;

FIG. 5 is a left side elevation of the structure shown in FIG. 1;

FIG. 6 is a rear elevation of the structure shown in FIG. 1;

FIG. 8 is a cross sectional view of a typical portion of the structure of FIG. 1 showing an external skin, an internal skin, and a hardened foam material disposed between the skins;

FIG. 9 is an elevational view of a typical releasable latch;

FIG. 10 is a side view of a typical hinge;

FIG. 11 is a side view of a typical releasable cam latch; and

FIG. 12 is a perspective view of an alternate shape for the integral storage cooler illustrated in FIG. 1.

DESCRIPTION OF A PREFERED EMBODIMENT

Figure 13:
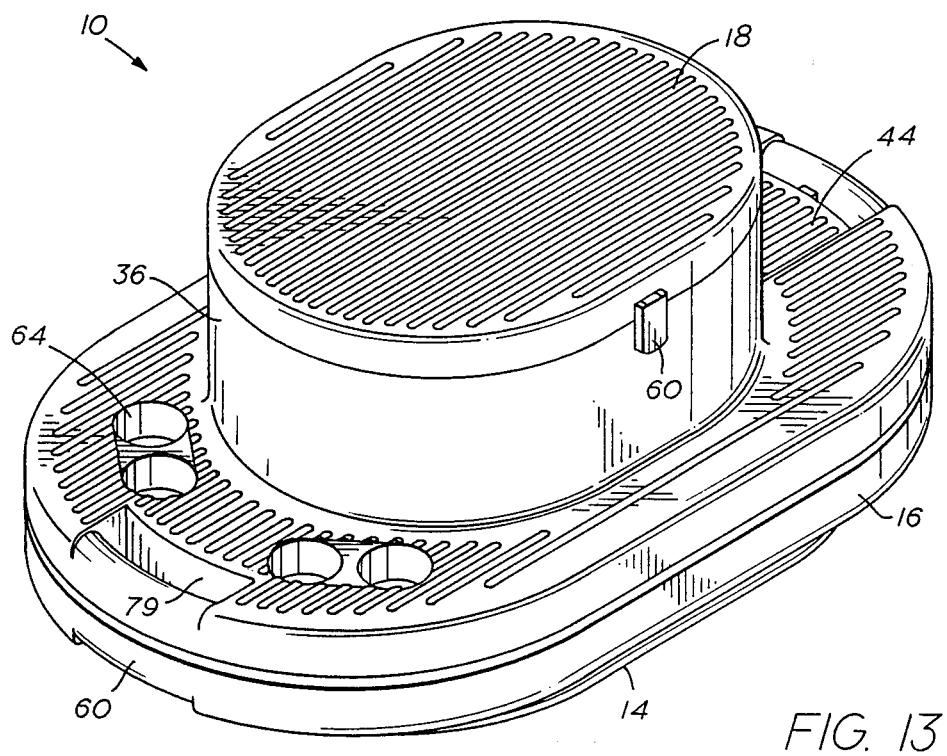
Figure 14:
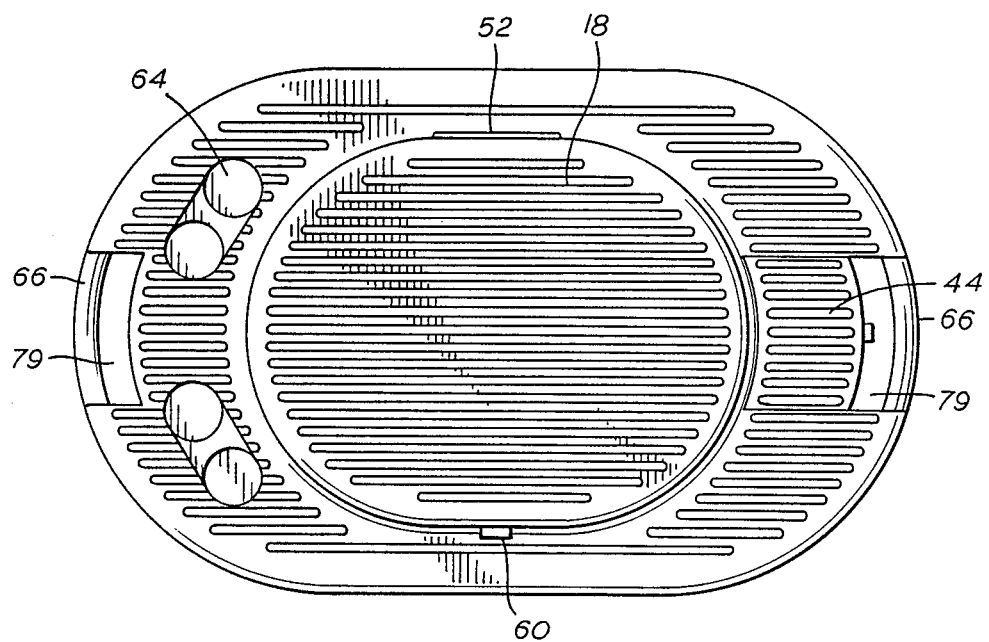

Referring to FIGS. 1-6 and 13-19, there is shown the integral floating cooling structure 10 of the present invention including a barge member 12 having a barge bottom 14 and sides 16 merged in with a storage chest 18 having a bottom 20 common with bottom 14, and sides 22 which are partly in common with the barge sides 16. The barge member 12 of the embodiment depicted in FIG. 1 is a flat bottom barge as contrasted with the barge member depicted in FIG. 13 which has a dropped and contoured bottom 14, and raised barge sides 16. The wall thickness contiguous with the interior of the storage chest 18 is of thickness to insulate the interior of the ice chest to remain at about 32° F. with the exterior temperature being ambient at the 70°–100° F. range as when people are in the water. Additionally, the barge sides 16 are greater thickness than the chest sides 22 in order for the cooler structure to be more stable against tipping and also to provide more volume within the barge sides for increased buoyancy. The barge sides 16 and the chest sides 22 merge together through a merging radius 68 to form, along with the barge bottom 14, a common unitary exterior surface 32. The inside surface of the chest 22 forms a common interior surface 34 for purposes of manufacture, as later described.

As seen in FIG. 7 and 8, the common exterior surface 32 is formed with an outer skin 36 and a common interior surface 34 is formed with a common inner skin 38. A cavity 40 is formed throughout the floating cooler structure 10 between the outer skin 36 and the inter skin 38. As shown, the cavity 40 is filled with a hardened foam material 42 provided of very low density foam for good buoyancy of the cooler structure in water. The foam 42 is bonded to the outer skin 36 and the inner skin 38 to give good structural strength to the cooler structure.

The foamed material 42 may be formed generally of a foamed material with examples being polyethylene, polypropylene, polyvynalchloride, (PVC), styrene, cellulose, and polymethlpenthene. As examples, the outer skin 36 and inner skin 38 maybe formed as of the same materials.

The cooler structure 10 as shown may be fabricated by providing a hollow mold formed with an internal configuration corresponding to the external configuration of the structure 10. The skins 36 and 38 may then be formed in the mold with the same procedure and with the same materials as used to manufacture plastic bottles of all types and sizes such as milk bottles, antifreeze containers, pharmaceutical containers, liquid chemicals, and the like. A foam of similar or compatible material may then be injected into the cavity remaining after the skins 36 and 38 are formed, then allowed to harden either by cooling or by chemical reaction.

The hinges, latches, and clasps as later described may be attached by fasteners after the cooler structure is removed from the mold or such hinges and latches maybe inserted into the mold before plastic is blown into the mold and thereby become part of the structure as is commonly done in the plastic molding art. As illustrated in FIGS. 13–19, the hinges 52 themselves may be contiguously molded with the outer skins 36 of hardened but deformable plastic, providing a plastic hinge.

Alternately, the cooler structure 10 may be made of hardened foam structure in a manner similar to the formation of picnic ice chests and rubber foam mattresses for example. In this method the foaming material is injected directly into the mold and allowed to complete foaming, expansion and subsequent hardening. The foaming and expansion causes a film to form against the walls of the mold which becomes the outer skin 36 and the inner skin 38 as shown as the foam develops and hardens.

While either of the methods above described may be used to form a usable cooler structure 10. The first procedure, which first blows in the film forming outer skin 36 and inner skin 38 then subsequently injects a foaming material to become the hardened foamed material 42, may be preferable in that the resulting structure is stronger, more resistent to scuffing and impacts, and is generally a better looking product.

On the other hand, the directly blown and skin forming foams such as the styrene used in making inexpensive ice chests, will produce a product of sufficiently little cost that it may be thrown away when and if sufficiently damaged.

Referring again to FIGS. 1–6 and FIGS. 13–19 the cooler structure 10 may be additionally provided with a personal effects safe 44 molded into and forming a part of the cooler structure 10. The safe 44 of FIGS. 1–6 is formed with a safe bottom 46 forming a common bottom with barge bottom 14 and a common partition 48 which is a common partition between the storage chest 18 and the safe 44. The sides of the safe 44 other than the partition 48 are the same as the sides of the storage chest 18. The personal effects safe 44 of the embodiment illustrated in FIGS. 13–19 is inset into the barge member as shown with safe bottom 46 slightly elevated above the common cooler bottom 20 and barge bottom 14. The sides and bottom of the effects safe 44 of the embodiment depicted in FIGS. 13–19 are contiguously molded into the outer surface skin 36 of the cooler structure during the previously described forming process, which provides a common partition 48 between the effects safe 44 and the storage chest 18 similar to that described above relating to FIGS. 1–6.

Figure 19:
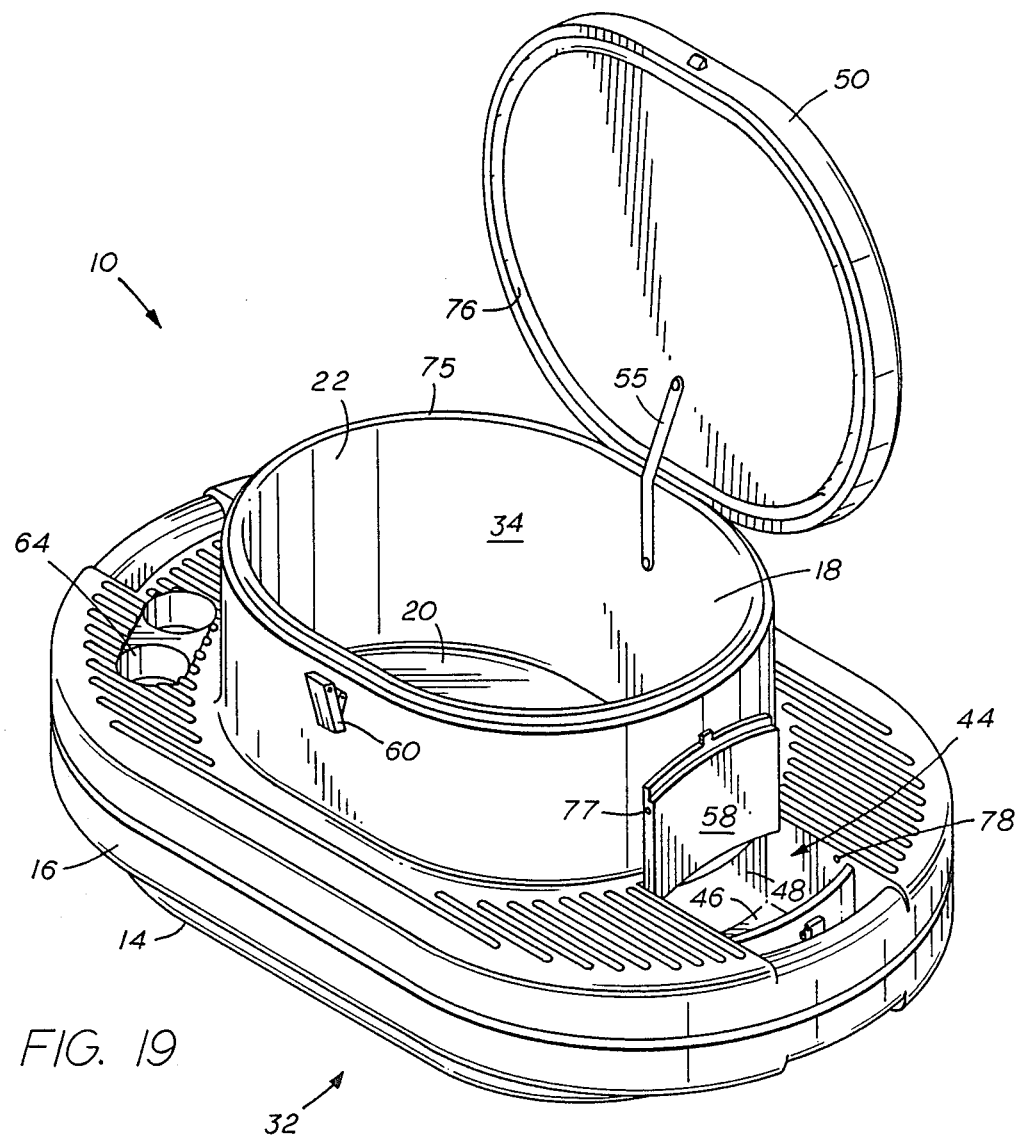

The storage chest 18 is closed by means of a closure lid 50 connected in hinged relation to structure 10 by hinges 52 and releasably latched closed by means of a hasp latch 54 as shown in FIG. 7. The closure lid 50 is formed with an inner skin and an outer skin with an inner hardened foam material in the same manner as previously described with reference to the fabrication of cooler structure 10. (FIG. 16). The closure lid 50 may also be provided with a retention strap 55 fixed at one end to the inner wall 22 of the storage chest and at the opposite end to the inner surface 38 of the closure lid as illustrated in FIG. 19. Because the floatable cooler chest is intended to be used out of door in all weather, the retention strap may be used to protect the hinge in the event the open closure lid is subjected to a sudden gust of wind or wave.

A sealing element, for sealing the juncture between the storage chest 18 and lid 50 may be a seal which is illustrated as an O-ring type seal 56 retained in a grove 57 formed in the skin of the cooler structure 10 during fabrication of the structure. FIG. 7. An alternative sealing element is depicted in a floating chest illustrated in FIG(S). 13–19, and is best understood by reference to FIGS. 16, 18 and 19. A tongue and groove sealing means is used, with the tongue 75 element formed around the perimeter along the upper edge of the storage chest 18. The matching groove 76 is formed around the perimeter of the underside of the closure lid 50. Both the tongue 75 and the groove 76 are formed in the same processes and at the same time as the chest structure and lid, respectively, as earlier described. A water tight seal may be achieved by controlling the tolerances of the tongue 75 and groove 76 to provide a close friction fitting joint. The cam action of the closure latch 60, described below, also assists in forcing or wedging the tongue 75 into the groove 76 to achieve the water tight seal.

The personal effects safe 44 as depicted in FIGS. 1-12 is closed by a closure cover 58 and retained closed by means of releasable cam hasps or latches 60. The upper edge around the safe 44 is grooved (not shown) to receive a sealing ring or sealing element to form a watertight seal as shown for cover lid 50 in FIG. 7. The cover 58 is made in the same manner as lid 50.

Alternatively, the personal effects safe 44 may be provided as in the embodiment illustrated in FIGS. 13-19, formed in the upper surface of the stabilizing barge element during the molding process previously described. The hinge elements and means for holding the safe lid 58 closed can be simple protrusion 77 formed in the lid that match corresponding concavities 78 formed in the upper interior perimeter of the effects safe. FIGS. 16 and 19, the lid will pivot on two rear protrusions, which may be slightly larger, with deeper concavities 78, than the front two protrusions 77. The effects safe lid seal may be formed with either the O-ring or tongue and groove as described above for the storage chest lid, or, in the alternative may simply use a close friction lid as illustrated in FIG. 19. The safe of the embodiment depicted in FIGS. 13-19 could also be constructed with the hinges 52, sealing elements 56 and 57, and the cam clasp closure 60 as described for the embodiment illustrated in FIGS. 1-12.

Towing eyes 62, as shown in FIGS. 1-6, are provided in the barge member 12 at the front so that a towing bridle or harness (not shown) may be attached by the person using the cooler structure 10 in connection, perhaps, with an anchoring means to anchor the structure 10 at a particular place while the person is doing something else such as scuba diving, catching fish, or the like. Hand clasp recesses 66 are formed in the end curves 70 of the barge bottom 14 to provide a convenient way to manually lift the cooler structure 10 and carry it about. Alternatively, as shown in FIGS. 13-19 the hand clasps 66 may be fashioned as openings 79 through the barge unit at each end. When so fashioned, the hand clasps themselves provide a location for attaching a tow rope or anchor, and the towing eyes 62 of FIGS. 1-6 may be dispensed with.

The cooler structure 10 can be a very convenient accessory while fishing, swimming, bird hunting, canoeing and other active activities where a person is in the water for an extended length of time. The chest can be towed behind a person wading or behind a canoe. The chest 18 may be utilized to store food, beverages, bait, fish, game birds, supplies for river or camping trips, and similar things. The beverage receptacles 64 are convenient for persons to park beverages during their consumption while the persons are in the water.

The personal affects safe is convenient for a person to store wallets, time pieces, cigarettes, combs, cosmetics, and the like for the ready access and convenient use of the user.

FIG. 12 illustrates an alternate circular shape designated as 10A for the cooler structure of the present invention. Such shape has merit and may be preferred by some users. The visible corresponding parts of the structure 10A are the same numbers as for the structure 10 with the suffix as shown. FIGS. 13-19 illustrate an alternative oval shape which combines the directional stability of the rectangular shape with what some users may perceive as the more aesthetic round shape. Corresponding numbers also identify analogous features of this embodiment. The oval shaped cooler structure also exhibits a slightly different shaped rounded barge bottom 14 and barge sides 16 which lowers the center of gravity of the structure of the cooler relative to the center of buoyancy for a given displacement volume. Therefore, the principle behind this embodiment is the same as for the earlier described rectangular embodiment. A buoyant and stable cooler for outdoorsmen is the end result.

As an example, an embodiment of the present cooler structure 10 of FIGS. 1-6 has been identified with the trade name "River Runner." Its internal dimensions are 11 inches wide, 16 inches long, and eight inches deep for the storage chest. The personal affects safe is 3 inches wide, 10 inches long, and 3.75 inches deep. The barge member 12 is 21 inches wide, 32 inches long, and 11 inches high. The minimum thickness of the chest sides 22 of the storage chest 18 is about 1 inch. The common bottom of the storage chest 18 and barge member 12 is about 1½ inches thick and the vertical thickness of the flat bottom barge is about 3 inches. This exemplary embodiment will weigh about 2.5-5 pounds, depending on the materials from which it is made. An embodiment of the cooler in accordance with FIGS. 13-19, of similar dimensions, has been identified with the trade name "Wave Rider".

It is to be understood that the cooling structure 10, when manufactured and marketed, may be smaller or several sizes larger than the exemplary sizes given above, depending upon the needs of the users.

It is also to be noted that color pigment may be included in the material forming the skins 36 and 38 to give the cooler structure 10 an attractive appearance and also to give greater visibility to the apparatus as given to marker buoys, life preservers, and the like. Such colors may be white, yellow, and traffic orange, for example.

What is claimed is:

1. A floating cooler chest comprising:
  (a) an integral molded body having:
    (i) a storage chest having:
      (a) rectangular sides and a rectangular bottom defining a first inner cavity,
      (b) the first inner cavity having rectangular sides and a rectangular bottom defining a first common inner surface, and
      (c) the sides and bottom of the storage chest being of sufficient thickness to provide thermal insulation;
    (ii) a personal effects safe having:
      (a) rectangular sides and a rectangular bottom defining a second inner cavity;
      (b) the second inner cavity having rectangular sides and a rectangular bottom defining a second common inner surface; and
      (c) one of the rectangular sides formed in common with the lower portion of one of the rectangular sides of the storage chest;
    (iii) the sides of the storage chest that are not formed in common with a side personal effects safe and the sides of the personal effects safe that are not formed in common with a side of the storage chest defining an outer side surface;

(iv) the bottom of the storage chest and the bottom of the personal effects safe defining a continuous lower surface;

(v) the lower portion of the outer side surface extending outwardly in all directions to form a barge member having barge side surfaces, a barge top surface and a barge bottom surface, and having a displacement volume sufficient to provide buoyancy for the floating cooler chest;

(iv) the barge bottom surface formed in common with the continuous lower surface of the storage chest and personal effects safe;

(vii) the lower portion of the outer side surface immediately above the barge member curving downwardly and outwardly as a radius merging with the barge top surface, and defining curved side surfaces;

(viii) a plurality of cylindrical cavities formed in the upper portion of the barge member through the barge top surface and curved side surface, and defining inner cylindrical cavity surfaces;

(ix) two opposite barge side surfaces curving downwardly and under the barge to merge with the barge bottom surface, and defining end bottom curve surfaces;

(x) end recesses formed in opposite ends of the bottom of the barge through the end bottom curve surfaces, and defining inner end recess surface;

(xi) the outer side surface, continuous lower surface, barge bottom surface, barge top surface, barge side surfaces, curved side surfaces, inner cylindrical cavity surfaces, end bottom curve surfaces and inner end recess surfaces defining a common exterior surface; and (b) a closure lid (in hinged connection with the) on top of the storage chest, releasing latching means for latching said closure lid in closed position, and sealing means for sealing the juncture of the closure lid with the top of the storage chest;

(c) a closure cover in removably (latched and) sealed relation with the top of the personal effects safe;

(d) towing eyes attached to the top of the barge near two corners at the same end of the barge; and (e) the first common inner surface, second common inner surface, and common exterior surface being formed in a mold as skins which enclose a cavity being filled with a hardened buoyant foam material.

2. The invention of claim 1 wherein said means for latching and sealing and releasibly retaining each of said closure lids comprises hinge means for each of said closure lids, releasing latch means for latching each of said closure lids in close position, and sealing means for sealing a juncture of each of said closure lids with the openings of each of said inner cavities.

3. A floating cooler comprising:
(a) an integral molded body comprising:
(i) a storage chest comprising contiguous and continuing inner sides and an inner bottom defining a first inner cavity within said body;
(ii) a personal effects safe comprising a continuous surface forming contiguous sides and a bottom defining a second inner cavity within said body wherein part of said continuous surface forms a common division between said first inner cavity and said second inner cavity;

(iii) a common exterior surface surrounding said storage chest and said personal effects safe and forming outer sides contiguous with and continuing into said inner sides, and forming an outer bottom contiguous with said outer sides, said exterior surface spaced from said inner sides and said inner bottom surfaces to provide sufficient thickness for thermal insulation;

(iv) a barge member formed contiguous with the lower portion of said common exterior surface comprising barge sides which extend outwardly with the lower portion of said common exterior surface immediately above said barge member curving downwardly and outwardly as a radius merging with a barge top surface and defining curved side surfaces and a barge bottom surface, wherein said barge bottom surface forms a common surface with said common exterior surface surrounding said storage chest and said effects safe;

(v) a plurality of cylindrical cavity surfaces in said upper portion of said barge member through said barge top surface which defines cylindrical cavities;

(v) end recesses formed in opposite ends of said bottom of said barge defining inner end recess surfaces;

(b) closure cover means for said storage chest and for said effects safe comprising at least one closure lid on top of said storage chest and said personal effects safe wherein each of said closure cover means comprises latch means and sealing means for releasibly retaining each of said closure covers and for sealing the juncture of each of said closure covers with said storage chest and said effects safe;

(c) means for attaching tow line means to said barge on at least one end of said barge, wherein said contiguous inner sides and inner bottom surfaces and said common exterior surface and said barge member and said cylindrical cavity surface and said end recesses are formed in a mold as skins enclosing a cavity filled with a harden buoyant foam material.

4. The invention of claim 3 wherein said walls of said storage chest form a rectangular enclosure when seen in plan view, and wherein said barge member forms a rectangular shape, relatively larger than said rectangular enclosure formed by said walls, when seen in plan view.

5. The invention of claim 3 wherein said walls of said storage chest form a circular enclosure when seen in plan view, and wherein said barge member forms a circular shape, relatively larger than said circular enclosure formed by said walls, when seen in plan view.

6. The invention of claim 3 wherein said walls of said storage chest form an oval enclosure when seen in plan view, and wherein said barge member forms an oval shape, relatively larger than said oval enclosure formed by said walls, when seen in plan view.

7. The invention of claim 3 wherein said latch means and sealing means comprises forming the closure cover as a friction fitting stopper sealing means which is sealingly inserted and pressed into the opening of said first inner cavity.

* * * * *